INVENTOR

URIEL VOGEL

BY Clive H. Bramson

ATTORNEY

United States Patent Office 3,492,480
Patented Jan. 27, 1970

3,492,480
SYSTEM FOR THE DETECTION OF CHARGED PARTICLES
Uriel Vogel, P.O. Box 68, Center Moriches, N.Y. 11934
Filed May 26, 1967, Ser. No. 641,676
Int. Cl. G01t 1/16; H01j 39/00
U.S. Cl. 250—83.3                                        10 Claims

ABSTRACT OF THE DISCLOSURE

A system for the detection of charged particles using a gated ion source which passes ions through a series of coaxial conducting rings or plates which induces a train of electric pulses in the rings which in turn excite oscillations in a ringing circuit. Signals are then fed through an amplifier to a coherent detector where the oscillations are integrated and produce a rising voltage ramp. A signal averaging computer records the voltage from the detector when receiving a pulse from a timing clock, which clock also controls detector and gated ion source.

Through feedback circuits involving gating, amplification and additional impedance to the ringing circuit, a signal to noise ratio is increased to allow low count particle detection.

---

The present invention refers to a detector system for charged particles and more particularly to the detection without destroying the charged particles.

Detectors usually found in the prior art can be classified either as (a) current detectors, (b) ion and electron multipliers, or (c) radiation detectors. Each of these has certain limitations in its use which are recognized.

Current detectors only measure electrical currents as low as $10^{-17}$ to $10^{-15}$ amperes or roughly 100 to 10,000 electronic charges per second.

Multipliers produce an electrical pulse for each particle that strikes them. They are suitable for the detection of particles flowing at a rate as low as one per $10^2$ seconds. Internal multiplier noise prevents the detection of lower rates.

Radiation detectors produce, as do the multipliers, a pulse for each particle. However, these detectors are sensitive to particles of high energy only and therefore must be excluded from many applications.

A limitation common to all of the above types of detectors are that they destroy the particles which are made to strike them. This makes it difficult to employ coincidence techniques when lower rates of particle flow are encountered such as a lower rate than $10^{-2}$ particles/second, or when particle velocity information is required.

It is an object of the system of the present invention to detect the presence of charged particles without destroying them.

It is also an object of the present invention to extend the noise limit of the detector of charged particles below the charge of a single electron.

The detection system of the present invention is suitable for applications in mass spectrometry but allows the elimination of the mass analyzer section usually found in a mass spectrometer, with a considerable simplification in structure and a reduction in weight.

The system of the present invention is efficient in its use of the information carried by the particles including their density and velocity distribution in space. Therefore this system may be suitably employed under conditions of low density. This allows application in space research and residual gas analysis, or more generally, in small sample mass spectrometry.

In the present system, the detector is velocity sensitive in that it can be tuned to record only particles of a certain range of velocities. The particles, after having excited the detector, can continue in their original flight and pass other detectors of a coincidence system.

Figure 1:
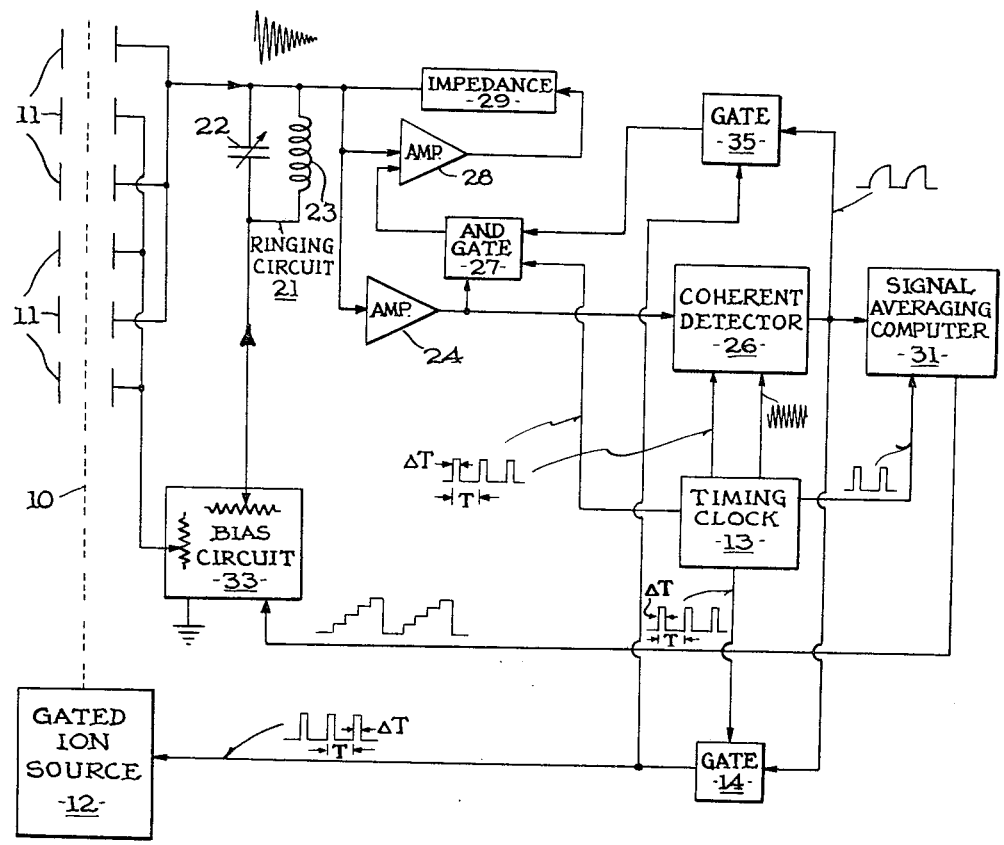
Figure 2:
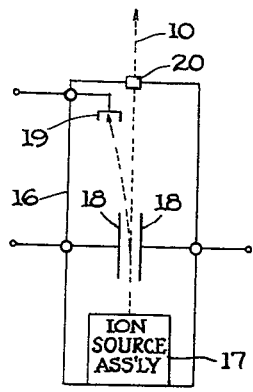

These as well as further objects and advantages which are inherent in the invention will become apparent from the following description, reference being had to the appended drawings wherein:

FIG. 1 is a partial schematic and block diagram of the overall system of the present invention for the detection of charged particles; and FIG. 2 is a schematic diagram of an ion source which may be used with the system of the present invention.

Referring to FIG. 1 in which is shown the parts in the system of the present invention for the detection of charged particles, a bunch of charged particles 10 passes through sensor rings 11, which may be a group of coaxial conducting rings, along their center axis, inducing a train of electric pulses in rings 11. Alternatively, aligned conducting plates may be used to receive the induced electric pulses from passing bunches of charged particles 10.

Charged particles 10 may be obtained from gated ion source 12 which is gated by a series of square pulses obtained from timing clock 13 through gate 14. One example of an ion source 12 is shown in FIG. 2 although any of those commercially available for use with mass spectrometers may be used.

The illustration of an ion source shown in FIG. 2 consists of vacuum envelope 16 containing therein ion source assembly 17 and deflector plates 18 aligned therewith. Deflector plates 18 are normally biased so that beam 10 of charged particles is deflected toward collector 19, away from exit window slit 20. The pulse from timing clock 13 deflects beam 10 through exit slit 20 to sensor rings 11. The illustration of the ion source self-contained within a vacuum envelope 16 is merely for illustration of an ion source since sensor rings 11 must also operate within a vacuum envelope or the vacuum of outer space.

A bunch of charged particles 10 that passes through sensor rings 11 induces a voltage across the terminals of a ringing circuit 21 consisting of capacitor 22 and inductance 23. This voltage excites oscillations in ringing circuit 21 with a linear buildup of oscillation amplitude taking place due to synchronism between the pulses of electric charge from the charged particles and the frequency of ringing circuit 21. The number of the growing oscillations is equal to the number of rings 11. The amplitude of these oscillations is largest when the flight time of the particles between a pair of rings corresponds to the resonant frequency of ringing circuit 21. The final voltage amplitude is dependent upon several factors including the electric charge contained in an ion pulse, the size of capacitor 22, and the number of sensor rings 11. Such voltage amplitude is equal to $qn/2c$, where $q$ is the total electric charge contained in one ion or charged particle bunch, $c$ is the parallel capacity of ringing circuit 21, and $n$ is the number of rings 11. In this mode of operation the duration $\Delta T$ of the timing pulses from timing clock 13 must be smaller than the period of the natural oscillation of ringing circuit 21. Thus, satisfying the condition $\Delta T < 1/f_0$ where $f_0$ is the resonance frequency of ringing circuit 21, peak to peak induced voltage in each ring is $q/c$. Short durations of $\Delta T$ will form ion bunches short enough to be completely screened by each of sensor rings 11 when the bunch passes the ring.

For high sensitivity of ringing circuit 21, high Q values are required. This may be accomplished by super cooling the resonating circuit or by the employment of resonators such as piezoelectric crystals.

The oscillations in ringing circuit 21 at the resonant frequency will slowly decay to a zero voltage value at a rate of decay inversely proportional to the Q factor of ringing circuit 21.

The oscillations, during their persistence and decay, are amplified in linear amplifier 24 and supplied to coherent detector 26.

For an analysis of the detection process the portions of the circuit including gate 27, amplifier 28, and impedance 29 need not be considered at this point.

The decaying oscillations in ringing circuit 21 can be written as:

$$U_i = (qn/2c) \sin t e^{-\omega t/2Q}$$

where $U_i$ is the instantaneous voltage across ringing circuit 21 or at the input of amplifier 24, $\omega$ is the resonant frequency, $t$ is the time and $Q$ is the quality factor. The output of amplifier 24 is $G_{24} U_i$ where $G_{24}$ is the gain of amplifier 24. The voltage $G_{24} U_i$ is supplied to coherent detector 26 which essentially integrates the envelope of its input signal so that a voltage S is obtained at the output of coherent detector 26 where $$S \sim \int_0^t U_i e^{-\omega t/2Q} \omega dt = 2Q U_i [1 - e^{-\omega t/2Q}]$$

The time $t$ in this case is counted from the time that the bunch of charged particles crossed sensor rings 11. The output of coherent detector 26 is in the form of a rising voltage ramp of highest voltage value $qnQ/c$ with a rise time of $2Q/\omega$. In these calculations, the internal gain of coherent detector 26 and the gain $G_{24}$ of amplifier 24 have been combined in a factor of proportionality that has been chosen as unity for the sake of convenience in this explanation. The reference signal from timing clock 13 to coherent detector 26 is a sinisoidal voltage of a frequency equal to that of ringing circuit 21 and of an adjustable phase.

Coherent detector 26 may be any of several known designs. One such design is a circuit in an article published in Review of Scientific Instruments on page 868 of the issue on July 1961.

The output of coherent detector 26 is fed to signal averaging computer 31 which records the amplitude of voltage value $qnQ/c$, and where the constant factors $n$, $Q$, and $c$ and the total gain are considered as unity for ease of calculation, the computer 31 is recording the total charge $q$. One of several possible known designs for signal averaging computer 31 may be found in an article entitled "Ion Counting and Accumulation System for Mass Spectrometry of Very Small Samples" by G. W. Barton et al. published in Analytical Chemistry, vol. 32, No. 12, November 1960, page 1599.

When a timing pulse is received by signal averaging computer 31, from timing clock 13 the voltage from coherent detector 26 is recorded in the proper portion of computer 31.

Concurrently with the pulses firing ion source 12, a sawtooth voltage is supplied to bias circuit 33. This voltage is supplied through signal averaging computer 31 but originates in timing clock 13 signals supplied to computer 31 where logic circuitry transforms them to a sawtooth voltage. The rate of change of this voltage is small so that during the time interval $\Delta T$ it is practically constant. This sawtooth voltage may be a stepped voltage, as shown, so that with each firing of an ion bunch this voltage is stepped by a small amount and stays constant until the next firing. This signal may also be any other modulating signal from timing clock 13.

At this stage a cycle has been completed and the system is ready to accept a new bunch of particles from gated ion source 12. As previously discussed, source 12 is triggered by pulses from timing clock 13 with timing clock 13 also supplying a reference voltage to coherent detector 26 of a frequency equal to the resonant frequency of ringing circuit 21, the phase of this reference voltage is locked to the timing pulses that trigger gated ion source 12.

The instantaneous value of the voltage from bias circuit 33, which received the sawtooth wave originating in timing clock 13 as discussed previously, determines the velocity of the group passing through sensor rings 11 when a bunch of ions crosses through those sensor rings 11. If this velocity is such that the induced voltage pulses are in synchronism with the resonant frequency of ringing circuit 21, slowly decaying oscillations will be induced in this circuit as previously explained. As the sawtooth voltage which is supplied to bias circuit 33 changes, repeated bunches fired from the ion source will be "tested" for synchronism. The coherent detector 66 will select ions of different velocities to resonate with ringing circuit 21 and subsequently to be recorded in signal averaging computer 31. The time interval T between the firing of bunches of ions, shown in FIG. 1 as the distance between leading edges of clock pulses, is determined by the signal rise time of the sawtooth wave. Therefore in order to record the height of the detected signal step voltages, time T must be greater than the rise time of the signal or $T > 2Q/\omega$. Just before the firing pulse occurs all the circuits are reset by a pulse from timing clock 13.

The mode of operation described above is suitable for bunches of ions with a sufficient number of particles so that the amplitude of the signal induced is greater than the noise level of the system. Even in the case where the noise level of the system as measured, for instance, at the input to signal averaging computer 31 is greater than the induced signal, the system discussed above will detect the signals provided a sufficient number of ion bunches has been recorded in signal averaging computer 31. This is due to inherent signal enhancement properties of the system of the present invention.

However, situations may arise where the supply of ions or charged particles is limited. The total number of particles per bunch may not be greater than one. This is provided for by this invention by further improvement in signal to noise ratio so that even single particles can be detected and recorded.

Amplifier 28 is an inverting amplifier so that ringing circuit 21 is shunted by a conductance of $(1+G_{28})/Z$ where $G_{28}$ is the gain of amplifier 28 and Z is the impedance 29. If impedance 29 is a capacitor, ringing circuit 21 will be shunted by a capacitor $C_f(1+G_{28})$ where $C_f$ is represented by impedance 29. The noise voltage across the terminals of ringing circuit 21 corresponds to one degree of freedom of thermal energy and we have $$U_n = \sqrt{k\tau/C_t}$$

where $U_n$ is the noise voltage, $k$ is the Boltzmann Constant, $\tau$ is the temperature of the circuit, and $$C_t = C + C_f(1+G_{28})$$

is the total parallel capacity of ringing circuit 21, where C is the capacity of ringing circuit 21 itself. By means of the feedback circuit of amplifier 28 and impedance 29, total parallel capacity $C_t$ may be made very large and consequently noise voltage $U_n$ may be made very small.

Amplifier 28 is gated by pulses originating in timing clock 13. Just before ion source 12 is fired, a gating pulse through gate 27 switches on amplifier 28. Ringing circuit 21 which normally has capacity C is shunted by a heavy capacity $C_t$ so that noise voltage $U_n$ is considerably lower. When ion source 12 is fired, amplifier 28 is switched off and ringing circuit 21 is again loaded only with its own capacity C. A particle which now happens to pass through sensor rings 11 will excite oscillations of amplitude $U_i$. The signal oscillations will then decay as previously explained. Noise voltage $U_n$, after having been kept at a low level where $U_n = \sqrt{k\tau/C_t}$, will grow to the level $U_n = \sqrt{k\tau/C}$. The rate of this growth is determined by the Q factor of the circuit. The larger the Q factor, the slower the rate at which random noise currents can store energy in ringing circuit 21. The average rate of growth of noise energy is $U_n^2/(2Q/\omega) = k\tau\omega/2QC$. Therefore, after heavy capacity $C_t$ is switched off, noise voltage $U_n$ will grow from its low value according to the formula:

$$U_n^2 = k\tau/C_t + (k\tau/C)(\omega\tau/2Q)$$

during the initial stage of noise growth. Eventually, after a time $2Q/\omega$ has elapsed, the noise will level off at an average value of $\sqrt{k\tau/c}$.

Next, the signal and noise at the output terminals of coherent detector 26 are considered. This signal to noise ratio can be calculated from information given above and with the value of total capacity $C_t$ made large enough so that the ratio $2QC/C_t$ is neglected compared to $\omega t$ following formula for noise is obtained:

$$N = 2/3\sqrt{k\tau/2QC}(\omega t)^{3/2}$$

and the signal to noise ratio at the output terminal of coherent detector 26 is: $S/N = 3/4qn\sqrt{2Q/k\tau C\omega t}$. Higher Q values and/or cooling of ringing circuit 21 to super-conductivity would further increase signal to noise ratio.

The input stage of signal averaging computer 31 in this mode of operation is a voltage discriminator set so that at a given time a pulse will be transmitted if the output of coherent detector 26 exceeds a predetermined voltage. The pulse is then recorded in computer 31. With this mode of operation triggering pulses are supplied to ringing circuit 21 just before the firing of a pulse from ion source 12. Coherent detector 26 is supplied with a rectangular pulse. The width of this pulse is a predetermined integration time. The leading edge of this pulse coincides with the triggering pulses to ringing circuit 21.

In the above considerations, thermal noise was assumed to be the only noise source. Other noise sources can be either ignored or compensation can be made for them. Noise due to amplifiers 24 and 28 can be ignored through proper choice of circuit parameters.

Another source of noice is related to the switching of amplifier 28. If the switching occurs at the instant impedance 29 is conducting current to ringing circuit 21, a transient train of oscillations will be induced and possibly recorded as a signal in computer 31. To avoid this, the output of amplifier 24 is supplied to AND gate 27 which transmits a triggering pulse to amplifier 28 only when the oscillations in ringing circuit 21 cross a zero instantaneous circulating current. A phase changing network at the input of gate 27 can serve as a fine adjustment to minimize this switching noise. This can be done automatically by applying a negative feedback error signal from the output of coherent detector 26 to control the "phase" in gate 27. Output voltage changes due to switching noise will thus be suppressed.

In summary, the single particle mode of operation is as follows. A triggering pulse is sent to gate 27 to initiate each cycle. Amplifier 28 is switched off for an interval of time of the order of $4\pi n/\omega$. During this interval of time ringing circuit 21 is building up oscillations due to noise. The resulting output of coherent detector 26 is fed to gate 27 to keep the output of coherent detector 26 within the minimum noise level. This output is also supplied to gate 14 so that ion source 12 can be fired only if the noise is within specified limits. When ion source 12 is fired, the whole process is repeated with the exception that a particle may now cross sensor rings 11 and be recorded in signal averaging computer 31. To enable the feedback circuit, minimizing the noise to distinguish signal from noise, gate 35 is cut off when ion source 12 has fired.

A considerable flexibility in logic is inherent in this invention. This flexibility can be handled so that a number of variations would result. One such variation would eliminate the firing of ion source 12 and gate bias circuit 33 instead. This variation should find application where the ion source is inaccessible or difficult to modulate.

Another source of variations is ringing circuit 21 where the feedback loop of amplifier 28 can be designed to decrease the parallel capacity by positive feedback. Also there may be various combinations of feedback loops in connection with amplifiers 24 and 28, gate 27, and impedance 29 which may be utilized to achieve maximum sensitivity or response to a given charge and minimum noise.

It will be obvious to those skilled in the art that various changes may be made without departing from the scope of the invention and the invention is not to be considered limited to what is shown in the drawings and described in the specification.

What is claimed Is:
1. A system for the detection of charged particles comprising:
   aligned means to detect the charged particles passing adjacent thereto,
   ringing circuit means connected to said aligned means to receive induced electric signals therefrom.
   detection means to detect signals from said ringing circuit means, and
   timing signal means connected to send timing signals to said detection means.
2. The system of claim 1, further characterized by:
   said aligned means being a plurality or coaxially aligned conducting rings.
3. The system of claim 1, further characterized by:
   feedback means connected to said ringing circuit means including amplifier means and impedance means connected in feedback loop.
4. The system of claim 3, further characterized by:
   gating means connected to said amplifier means, and said timing signal means connected to said amplifier means through said gating means.
5. The system of claim 4, further characterized by:
   said gating means being an AND gate.
6. The system of claim 5, further characterized by:
   additional gating means connected between said detection means and said AND gate.
7. The system of claim 1, further characterized by:
   ion gating means to gate the supply of ions to and through said aligned means.
   said timing means connected to send timing signals to said ion gating means.
8. The system of claim 1, further characterized by:
   bias circuit means connected to said aligned means, said ringing circuit means, and said timing signal means.
9. The system of claim 8, further characterized by:
   computing means connected to record voltage amplitude output from said detection means,
   said bias circuit means connection to said timing signal means being made through said computing means,
   said computing means having circuit means therein to produce a sawtooth type waveform to send to said bias circuit means.
10. The system of claim 1, further characterized by:
   said aligned means being a plurality of conductors having openings therethrough in substantially concentric alignment,
   feedback means connected to said ringing circuit means, gating means connected to said feedback means, and ion gating means to gate the supply of ions to and through said aligned means,
   said timing signal means connected with said gating means and said ion gating means.

References Cited

UNITED STATES PATENTS

| | | | |
|---|---|---|---|
| 3,188,472 | 6/1965 | Whipple | 250—83.3 |
| 3,265,895 | 8/1966 | Baker | 250—83.3 |

ARCHIE R. BORCHELT, Primary Examiner